United States Patent
Bai et al.

(10) Patent No.: US 9,922,564 B2
(45) Date of Patent: *Mar. 20, 2018

(54) VEHICLE PEDESTRIAN SAFETY SYSTEM AND METHODS OF USE AND MANUFACTURE THEREOF

(71) Applicant: Honda Motor Co., Ltd., Tokyo (JP)

(72) Inventors: Xue Bai, Novi, MI (US); Radovan Miucic, Southfield, MI (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/673,383

(22) Filed: Aug. 9, 2017

(65) Prior Publication Data

US 2017/0372612 A1    Dec. 28, 2017

Related U.S. Application Data

(63) Continuation of application No. 15/187,764, filed on Jun. 20, 2016, now Pat. No. 9,786,178, which is a
(Continued)

(51) Int. Cl.
 *B60Q 1/00* (2006.01)
 *G08G 1/16* (2006.01)
 *B60K 35/00* (2006.01)

(52) U.S. Cl.
 CPC ............. *G08G 1/166* (2013.01); *B60K 35/00* (2013.01); *G08G 1/161* (2013.01); *B60K 2350/1096* (2013.01); *B60K 2350/2052* (2013.01)

(58) Field of Classification Search
 CPC ........ G08G 1/166; G08G 1/161; B60K 35/00; B60K 2350/1096; B60K 2350/2052
(Continued)

(56) References Cited

U.S. PATENT DOCUMENTS 6,218,947 B1    4/2001  Sutherland
6,337,637 B1    8/2002  Kubota et al.
(Continued)

FOREIGN PATENT DOCUMENTS

EP     2511121        10/2012
WO     2014011556     1/2014

OTHER PUBLICATIONS

Pierre Merdrignac, 'Cooperative perception and communication system for protection of vulnerable road users', National Institute for Research in Computer Science and Control, RITS—Robotics and Intelligent Transportation Systems.
(Continued)

*Primary Examiner* — Ojiako Nwugo
(74) *Attorney, Agent, or Firm* — Rankin, Hill & Clark LLP

(57) ABSTRACT

The systems and methods are directed to a vehicle control system for use with: a vehicle communications network, at least one source of pedestrian data relevant to at least one pedestrian's location, and at least one source of vehicle system data relevant to the vehicle's location and movement. The control system can include a processor that is configured to determine a vehicle's current location and speed based on the vehicle system data, build a predetermined number of vehicle polygons hardcoded into an application for representing a predicted path of the vehicle, build at least one pedestrian polygon representing a predicted path for at least one pedestrian detected in pedestrian data, and define a plurality of warning zones based on the vehicle polygons, and determine if one or more of the pedestrian polygons intersects at least one of the predetermined number of hardcoded vehicle polygons.

20 Claims, 10 Drawing Sheets

Related U.S. Application Data continuation-in-part of application No. 14/450,097, filed on Aug. 1, 2014, now Pat. No. 9,421,909, said application No. 15/187,764 is a continuation-in-part of application No. 14/566,562, filed on Dec. 10, 2014, now Pat. No. 9,505,412, which is a continuation-in-part of application No. 14/450,097, filed on Aug. 1, 2014, now Pat. No. 9,421,909.

(60) Provisional application No. 61/861,886, filed on Aug. 2, 2013.

(58) Field of Classification Search
USPC ..... 340/435, 436, 438; 701/36, 49, 300, 301
See application file for complete search history.

(56) References Cited

U.S. PATENT DOCUMENTS

| | | | |
|---|---|---|---|
| 6,540,275 B1* | 4/2003 | Iwamoto | B60R 19/12 293/109 |
| 7,095,336 B2 | 8/2006 | Rodgers et al. | |
| 7,271,736 B2 | 9/2007 | Siegel et al. | |
| 7,202,776 B2 | 10/2007 | Breed | |
| 7,375,622 B2 | 5/2008 | Takata | |
| 7,576,639 B2 | 8/2009 | Boyles et al. | |
| 7,629,899 B2 | 8/2009 | Breed | |
| 7,630,806 B2 | 10/2009 | Breed | |
| 7,852,462 B2 | 12/2010 | Breed et al. | |
| 7,908,060 B2 | 3/2011 | Basson | |
| 8,164,432 B2 | 4/2012 | Broggi et al. | |
| 8,195,394 B1 | 5/2012 | Zhu et al. | |
| 8,253,589 B2 | 8/2012 | Grimm et al. | |
| 8,093,999 B2 | 10/2012 | Bauer et al. | |
| 8,340,894 B2 | 12/2012 | Yester | |
| 8,390,440 B2 | 3/2013 | Krautter | |
| 8,509,523 B2 | 8/2013 | Schamp | |
| 8,547,249 B2* | 10/2013 | David | G08G 1/163 340/435 |
| 8,594,370 B2 | 10/2013 | Schamp et al. | |
| 2005/0149251 A1 | 7/2005 | Donath et al. | |
| 2005/0194777 A1 | 9/2005 | Manwaring et al. | |
| 2006/0015219 A1 | 1/2006 | Kynast et al. | |
| 2007/0112513 A1* | 5/2007 | Mathevon | B60R 21/0136 701/301 |
| 2008/0231703 A1 | 9/2008 | Nagata et al. | |
| 2008/0243389 A1* | 10/2008 | Inoue | G08G 1/165 701/301 |
| 2009/0018711 A1 | 1/2009 | Ueda et al. | |
| 2009/0143987 A1* | 6/2009 | Bect | B60R 21/0134 701/301 |
| 2009/0171536 A1* | 7/2009 | Zimmer | B60R 21/0134 701/49 |
| 2009/0279738 A1 | 11/2009 | Sasaki | |
| 2010/0102972 A1 | 4/2010 | Middlekauff et al. | |
| 2010/0305858 A1 | 12/2010 | Richardson | |
| 2011/0090093 A1 | 4/2011 | Grimm et al. | |
| 2011/0106376 A1 | 5/2011 | Tijerina et al. | |
| 2011/0140968 A1 | 6/2011 | Bai et al. | |
| 2011/0199199 A1 | 8/2011 | Perkins | |
| 2011/0254703 A1* | 10/2011 | Li | G08G 1/005 340/944 |
| 2011/0288774 A1* | 11/2011 | Bengtsson | G08G 1/16 701/301 |
| 2011/0301802 A1 | 12/2011 | Rupp et al. | |
| 2012/0016581 A1 | 1/2012 | Mochizuki | |
| 2012/0025964 A1 | 2/2012 | Beggs et al. | |
| 2012/0068859 A1 | 3/2012 | Mochizuki | |
| 2012/0095646 A1 | 4/2012 | Ghazarian | |
| 2012/0129544 A1 | 5/2012 | Hodis | |
| 2012/0144346 A1 | 6/2012 | Meredith | |
| 2012/0296603 A1 | 11/2012 | Kulik | |
| 2012/0300078 A1 | 11/2012 | Ogata et al. | |
| 2012/0303271 A1 | 11/2012 | Chowdhary | |
| 2012/0008129 A1 | 12/2012 | Lu et al. | |
| 2012/0323479 A1* | 12/2012 | Nagata | B60Q 9/008 701/301 |
| 2013/0029650 A1 | 1/2013 | Xiao et al. | |
| 2013/0060400 A1 | 3/2013 | Hahne | |
| 2013/0144490 A1 | 6/2013 | Lord | |
| 2013/0184980 A1* | 7/2013 | Ichikawa | B25J 9/1676 701/301 |
| 2013/0187792 A1 | 7/2013 | Egly | |
| 2014/0051346 A1 | 2/2014 | Lin et al. | |
| 2014/0081521 A1 | 3/2014 | Fröjdh et al. | |
| 2014/0085470 A1* | 3/2014 | Sako | G03B 21/006 348/148 |
| 2014/0112538 A1 | 4/2014 | Ogawa et al. | |
| 2014/0125474 A1 | 5/2014 | Gunaratne | |
| 2014/0142798 A1 | 5/2014 | Guamizo Martinez et al. | |
| 2015/0005981 A1 | 1/2015 | Grimm et al. | |
| 2015/0035685 A1 | 2/2015 | Strickland et al. | |
| 2015/0153184 A1 | 6/2015 | Mudalige et al. | |
| 2015/0298693 A1 | 10/2015 | Uechi | |
| 2015/0314783 A1* | 11/2015 | Nespolo | B60W 30/0953 701/301 |
| 2016/0114800 A1* | 4/2016 | Shimizu | B60W 30/0956 701/70 |

OTHER PUBLICATIONS

Notice of Allowance of U.S. Appl. No. 15/187,764 dated May 9, 2017, 21 pages.
Notice of Allowance of U.S. Appl. No. 14/450,097 dated Apr. 22, 2016, 23 pages.
Office Action of U.S. Appl. No. 14/450,097 dated Dec. 17, 2015, 14 pages.
Notice of Allowance of U.S. Appl. No. 14/566,562 dated Aug. 2, 2016, 9 pages.
Office Action of U.S. Appl. No. 14/566,562 dated Apr. 14, 2016, 17 pages.
Office Action of U.S. Appl. No. 14/566,562 dated Dec. 17, 2015, 21 pages.

* cited by examiner

VEHICLE PEDESTRIAN SAFETY SYSTEM AND METHODS OF USE AND MANUFACTURE THEREOF

RELATED APPLICATIONS

This application is a continuation of U.S. application Ser. No. 15/187,764 filed on Jun. 20, 2016, which is expressly incorporated herein by reference. U.S. application Ser. No. 15/187,764 is a continuation-in-part of U.S. application Ser. No. 14/450,097 filed on Aug. 1, 2014, and now issued as U.S. Pat. No. 9,421,909, which claims priority to U.S. Provisional Application Ser. No. 61/861,886 filed Aug. 2, 2013, both of which are expressly incorporated herein by reference.

U.S. application Ser. No. 15/187,764 is also a continuation-in-part of U.S. application Ser. No. 14/566,562 filed on Dec. 10, 2014, and now issued as U.S. Pat. No. 9,505,412, which is a continuation-in-part of U.S. application Ser. No. 14/450,097 filed on Aug. 1, 2014, and now issued as U.S. Pat. No. 9,421,909, all of which are expressly incorporated herein by reference.

BACKGROUND

The disclosed subject matter relates to a vehicle pedestrian safety system, and methods of use and manufacture thereof. In particular some embodiments relate to methods and apparatus for generating, transmitting, and/or receiving data using a connected vehicle system that relates to enhancing pedestrian safety.

The travel of a vehicle along predetermined routes, such as on highways, roads, streets, paths, etc. (hereinafter generically referred to as paths) can be affected by other vehicles, objects, obstructions, and pedestrians (hereinafter generically referred to as Vulnerable Road User or VRU) on, at or otherwise in proximity to the path. The circumstances in which a vehicle's travel is affected can be numerous and diverse, and thus vehicle communications networks can be used to address these circumstances.

SUMMARY

As one example, one or more pedestrians disposed within a predefined distance of a subject vehicle may be either walking, jogging, or stopped within or near a path of the subject vehicle and may cause or otherwise require the subject vehicle to stop or reduce its speed to avoid a collision. The immediacy of this requirement to stop or reduce speed is dictated by the location of the pedestrian relative to the path of the vehicle, a distance between the subject vehicle and the pedestrian, as well as the direction the pedestrian is heading (or predicted direction). It may also be necessary for the subject vehicle operator to observe other pedestrians near the vehicle path in order to maintain a safe distance. For example, a pedestrian suddenly entering a road or path of the subject vehicle can surprise the subject vehicle operator and create a dangerous scenario for the pedestrian and for other vehicles. The subject vehicle may thereby need to rapidly reduce speed or sharply swerve to avoid colliding with the pedestrian causing the subject vehicle to potentially collide with another vehicle.

In many of the above and other scenarios, it may be beneficial to determine whether a pedestrian is located within a predefined distance of the subject vehicle, and whether the pedestrian and the subject vehicle are separated by a safe or otherwise relevant distance. For example, if the pedestrian is too close to the path of the subject vehicle, then it may be beneficial to provide the subject vehicle with a warning to increase the distance separating the pedestrian from the subject vehicle, such as by a display the subject vehicle operator can readily view.

It may also be beneficial to collect and analyze data from the information disclosed above (such as with regard to a pedestrian potentially within the path of the subject vehicle) into account in addressing the above scenarios. For example, it may be particularly important to predict scenarios where the subject vehicle will need to reduce its speed, and to further reduce its speed slowly to avoid colliding with a pedestrian. Under these circumstances, the subject vehicle can predict whether the pedestrian may enter, or has already entered, a path of the subject vehicle, allowing the subject vehicle operator additional time to react to the pedestrian.

It may therefore be beneficial to combine real time or current pedestrian data with subject vehicle data using a data analysis system to generate actual and/or predicted vehicle movement and actual and/or predicted pedestrian movement to determine one or more levels of alerts or warnings to a vehicle operator as to the likelihood of a collision. For example, anticipated or mathematically derived movements of a pedestrian can be determined based on the real time data collected from one or multiple sources, and the relevance of these actual or predicted movements can be analyzed by a data analysis system in the subject vehicle.

It may also be beneficial to supplement the methods and apparatus for generating locations of pedestrians on or near a path of the vehicle, with methods and apparatus for detecting and/or analyzing information relating to pedestrians in a vicinity of a subject vehicle traveling on the path, such as a pedestrian moving towards a predicted path of the subject vehicle. An apparatus can include a control system that can include a processor-based controller to generate alerts or warnings to a subject vehicle operator and/or generate alerts or warnings to the subject pedestrian. For example, based on data received in messages from location-enabled devices carried by one or more pedestrians and operation data from the subject vehicle, the controller can generate a prediction that one or more of the pedestrians could potentially enter a predicted path of the subject vehicle, or conversely, that there is a potential for the subject vehicle to enter a predicted path of one of the pedestrians. The controller can generate a response to the effects of the pedestrian data and generate one or more visual and/or audible alerts or warnings to the operator of the subject vehicle. The alerts could inform the operator of the pedestrian location, warn of an impending collision, and/or provide an alert to hard brake the subject vehicle.

Thus, it may be beneficial to address at least one of the issues identified above. For example, it may be beneficial to facilitate operation of a V2P application in an in-vehicle controller that can network and communicate with remote devices worn by pedestrians. In addition, the above and/or other processes and configurations can be implemented in software and use a menu driven user interface in all of the contexts disclosed above including for each type of application. However, embodiments are intended to include or otherwise cover any other beneficial type of user interface for implementing the above applications, operations, configurations, etc. Some other embodiments are directed to a method of configuring a processor based computer system for enabling an implementer to install and configure a controller for deployment in a vehicle control system.

Some embodiments are therefore directed to a vehicle control system for use with: a vehicle communications network, at least one source of pedestrian data relevant to at least one pedestrian's location, and at least one source of vehicle system data relevant to the vehicle's location and movement. The control system can include a processor that is configured to access the pedestrian data and the vehicle system data, determine a vehicle's current location and speed based on the vehicle system data, build a predetermined number of vehicle polygons hardcoded into an application for representing a predicted path of the vehicle, build at least one pedestrian polygon representing a predicted path for at least one pedestrian detected in pedestrian data, define a plurality of warning zones based on the vehicle polygons, each warning zone defined by one or more vehicle polygons within the predicted path of the vehicle with a different level of warning based on a distance of each vehicle polygon from the vehicle, determine if one or more of the pedestrian polygons intersects at least one of the predetermined number of hardcoded vehicle polygons, and actuate a warning to a vehicle operator based on an intersection of the one or more pedestrian polygons with one or more of the vehicle polygons.

Some embodiments are also directed a vehicle control system for use with: a vehicle communications network, at least one source of pedestrian data relevant to at least one pedestrian's location, and at least one source of vehicle system data relevant to the vehicle's location and movement. The control system can include a vehicle communication system that is configured to receive pedestrian data from a pedestrian transceiver device, the pedestrian data including one or more pedestrian locations relevant to a location of the vehicle, and an electronic storage medium that is configured to store at least one of the pedestrian data and vehicle system data. The control system can also include a processor that is configured to access the pedestrian data and the vehicle system data, determine a vehicle's current location and speed based on the vehicle system data, build a predetermined number of vehicle polygons hardcoded into an application for representing a predicted path of the vehicle, build at least one pedestrian polygon representing a predicted path for at least one pedestrian detected in pedestrian data, define a plurality of warning zones based on the vehicle polygons, each warning zone defined by one or more vehicle polygons within the predicted path of the vehicle with a different level of warning based on a distance of each vehicle polygon from the vehicle; determine if one or more of the pedestrian polygons intersects at least one of the predetermined number of hardcoded vehicle polygons, and actuate a warning to a vehicle operator based on an intersection of the one or more pedestrian polygons with one or more of the vehicle polygons.

Other embodiments are directed to a method to enhance pedestrian safety using a vehicle control system that is configured for use with: a vehicle communications network, at least one source of pedestrian data relevant to at least one pedestrian's location, and at least one source of vehicle system data relevant to the vehicle's location and movement. The method can include accessing the pedestrian data and the vehicle system data, determining the vehicle's current location and speed based on the vehicle system data, determining the pedestrian's current location and speed based on the pedestrian data, building a predetermined number of vehicle polygons hardcoded into an application that represent a predicted path of the vehicle, building at least one pedestrian polygon that represents a predicted path the pedestrian, defining a plurality of warning zones based on the vehicle polygons, each warning zone defined by one or more vehicle polygons within the predicted path of the vehicle with a different level of warning based on a distance of each vehicle polygon from the vehicle, determining if one or more of the pedestrian polygons intersects at least one of the predetermined number of hardcoded vehicle polygons, and actuating a warning to a vehicle operator based on an intersection of the one or more pedestrian polygons with one or more of the vehicle polygons.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

I. Network Environment for a Vehicle

Figure 1:
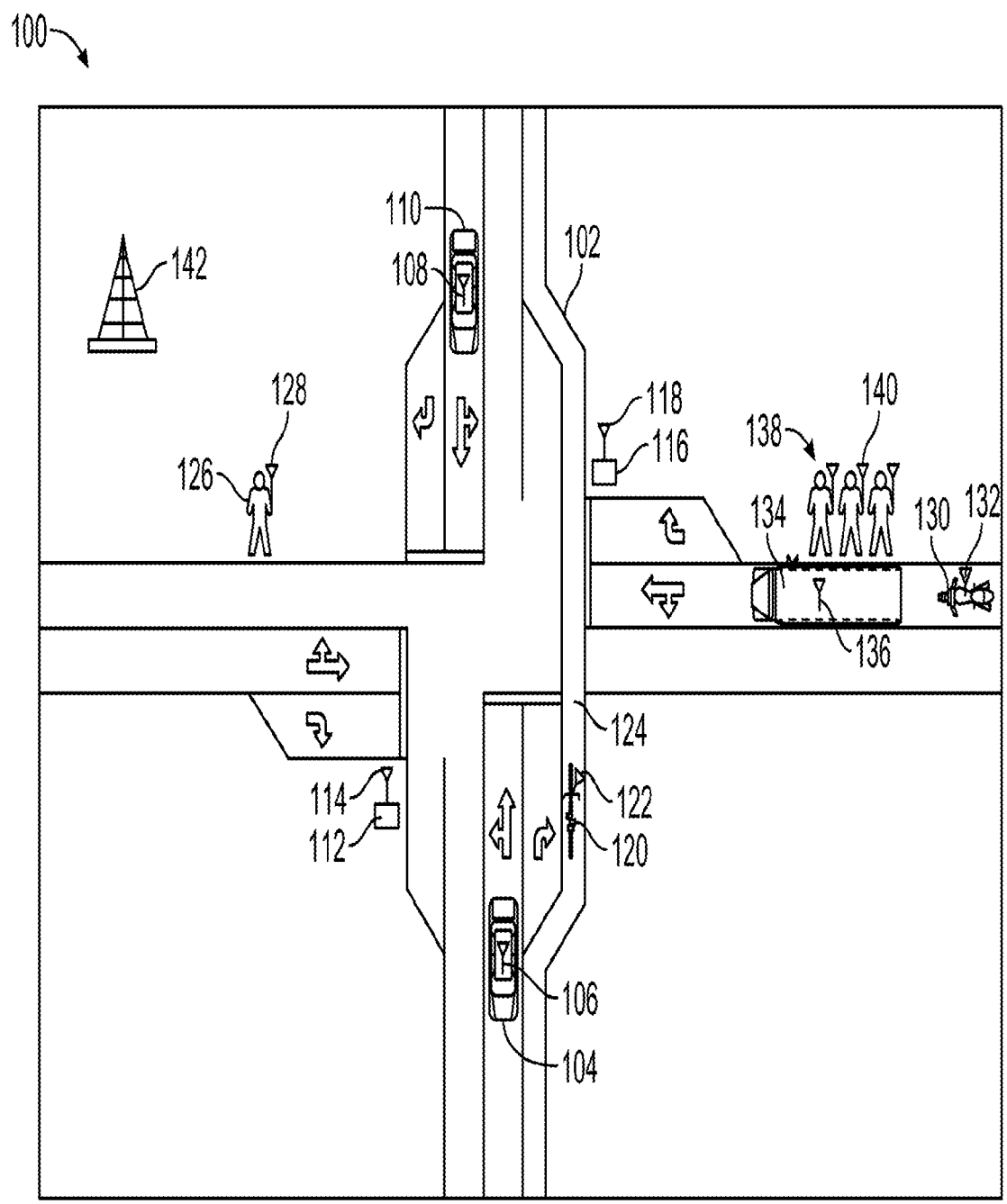
FIG. 1 is a schematic of a traffic scenario that involves V2X connected vehicles, pedestrians, and other entities at an intersection.

FIG. 1 is a schematic of a traffic scenario that involves network connected vehicles, pedestrians, and other entities at an intersection. Some of the disclosed embodiments relate to controllers configured with technology for a vehicle that can analyze, display, and/or control commands and information including but not limited to vehicle data and statistics, navigation and traffic data, collision warning data, network communication information, and multi-media management and playout, etc. In the disclosed embodiments, vehicles configured with in-vehicle computer and display technology can include automobiles, trucks, vans, minivans, sport utility vehicles (SUVs), busses, recreational vehicles, amusement park vehicles, trams, golf carts, robotically controlled vehicles, automated drive vehicles, remote controlled vehicles, drones, motorcycles, scooters, mopeds, ATVs, trains, trams, light rail trains, boats, ships, or other watercraft, aircraft, helicopters, or any transport related entity. In fact, the various disclosed methods and apparatus are intended to be usable with any type of mode of transport that can travel along, or can be located in proximity to, any improved, unimproved, and/or unmarked route or path.

The disclosed vehicle communication technology is intended to be implemented with any known, related art or later developed technologies. For example, some embodiments can be implemented using Dedicated Short Range Communications (DSRC) networks (including but not limited to those types of networks currently used by some transport and traffic systems, such as for automatic toll collection), ad hoc networks, wireless access in vehicular environments (WAVE), cellular networks, Wi-Fi networks, and/or any other network protocol that can provide the desired functionalities.

The embodiments are disclosed below in the context of a DSRC network, which is a short to medium range communications service that provides communications links with high data transfer rates with acceptable or minimal latency. However, the embodiments intend to include or otherwise cover the use of other networks and wireless communication standards. Vehicles, users, and infrastructure equipped with DSRC systems may communicate with each other, with remote DSRC compatible transceivers over a network, or with roadside equipment (such as transport related infrastructure). The range of DSRC is typically about 300 meters, with some systems having a maximum range of about 1000 meters. DSRC in the United States typically operates in the 5.9 GHz range, from about 5.85 GHz to about 5.925 GHz, and the typical latency for DSRC is about 50 ms. Some DSRC systems communicate with vehicles operating at 100 miles per hour or less, but embodiments are intended to cover communications with vehicles traveling at any speed.

Vehicle applications for pedestrian safety can be useful to implement with connected vehicle (V2X or Vehicle-to-Everything) technology. V2X is an emerging technology that can be beneficial to enhance VRU roadway safety. The technology, generally referred to as V2X communications, can include communications among vehicles and to or from other entities on or nearby the roadway. V2X technology can have various applications beneficial to enhancing roadway safety, mobility, and a positive environmental impact. Some applications for Vehicle to Vehicle (V2V) and Vehicle to Infrastructure (V2I) technology have been identified by governmental regulating authorities as software and systems that can enhance roadway safety. Certain V2X applications for a vehicle control system are intended to make V2X communications beneficial for users.

A traffic scenario 100 can include, but is not limited to, V2X connected vehicles, pedestrians, and any other vulnerable road units (VRUs) on or off a road or path. Various users, entities, and vehicle communication network components can be disposed at or proximate the disclosed intersection 102, including a host vehicle 104, a remote vehicle 110, road side equipment (RSE) 112 and 116, a bicycle 120, a pedestrian 126, a school bus 134, a group of pedestrians 138, and a motorcycle 130. However, the above users, entities, and components are merely provided for exemplary purposes to facilitate explanation of the disclosed vehicle communication network, and alternative or additional features may be provided.

In addition, FIG. 1 shows a cellular network antenna 142 for use with an extended vehicle communication network that can transmit DSRC signals over a modulated carrier.

The host vehicle 104 can transmit, receive and/or exchange communications including data, images, messages, and other information with other vehicles and entities using a DSRC network, which can be implemented with DSRC compatible transceivers, such as V2X compatible transceivers. "V2X" is used in the present disclosure to cover "vehicle-to-everything" communications, and variations of V2X designations may depend on the intended user that is transmitting V2X signals.

For example, V2V, V2M (Vehicle to Motorcycle), and V2P (Vehicle to Pedestrian) technologies can advantageously provide a warning to a driver of a potential collision with other V2X-enabled entities, such as a remote vehicle (car, truck, motorcycle) or a pedestrian. V2X applications can also beneficially warn a driver of certain roadway scenarios that can include but are not limited to a remote vehicle in a same lane performing a hard brake, a remote vehicle swerving or losing control in the same vicinity as the host vehicle, a remote vehicle merging into the same lane as the host vehicle, tailgating, etc. In another example, V2I technology can beneficially warn a driver of a red light violation, over-speeding in a curve, an upcoming work zone or lane closure, severe weather conditions, etc. V2X software applications that can be installed in an on-board Controller are available for implementers to select from for deployment.

Each V2X compatible entity can receive and/or exchange messages with any or all other V2X compatible entities. Components of V2X devices can exchange safety messages, warnings and alerts, and/or other useful information between V2X users. As an example, a host vehicle V2V transceiver 106 may exchange messages with a V2V transceiver 108 installed in remote vehicle 110 and/or with a V2P transceiver 128 carried by the pedestrian 126. V2X messages can describe any collection or packet of information and/or data that can be transmitted between V2X communication devices. Messages may take the form of basic safety messages and/or may contain more information than basic safety messages, such as entity location data, movement data, identification, commands that can control another vehicle's automated driving system, etc. V2X messages may include any number of bytes of information or data. In some embodiments, the V2V transceiver 106 is intended to be used with one or more vehicle safety systems. Examples of vehicle safety systems include, but are not limited to, collision warning systems, lane departure warning systems, integrated vehicle-based safety systems, automatic guided vehicle systems, other types of safety systems, etc. For example, the information may be useful for a particular vehicle in order to warn a vehicle or broadcast a warning to a group of V2X users in the traffic scenario 100. For example, the host vehicle 104 can include a collision warning system that can receive and assess safety information and data.

In other embodiments, the host vehicle 104 may exchange information between one or more V2X compatible entities. For example, the host vehicle 104 V2V transceiver 106 and remote vehicle V2V transceiver 108 may be configured to exchange vehicle information that can include, but is not limited to, the type of user or vehicle, navigation data, road hazard data, collision warning data, course heading data, course history data, projected course data, kinematic data, current position data, range or distance data, speed and acceleration data, location data, vehicle sensory data, vehicle subsystem data, and/or any other vehicle information. In various embodiments, the host vehicle 104 may exchange information using V2X protocols with any number of vehicles, pedestrians, or any other V2X users with an operational V2X transceiver. For example, the host vehicle 104, remote vehicle 110, motorcycle 130, and school bus 134 may be configured to exchange information over V2X protocols with road side equipment 112 over V2I transceiver 114 protocols and road side equipment 118 V2I transceiver 118 using V2I protocols. In another example, the school bus 134 can broadcast DSRC alert messages to all other vehicles at intersection 102 via V2VP transceiver 136 that school children are offloading at a bus stop, and the group of pedestrians 138 (school children) carrying V2P transceivers 140 can broadcast alert messages with their location to all vehicles in the intersection 102. In another example, FIG. 1 also shows a bicycle lane 124 along which the bicycle 120 can travel while transmitting V2B messages containing the bicycle's location, speed, and heading to the host vehicle 104 using a V2B transceiver 122. Similarly, the motorcycle 130 can travel through intersection 102 while transmitting V2M messages containing the motorcycle's location using a V2M transceiver 132.

II. In-Vehicle Controller System

Figure 2:
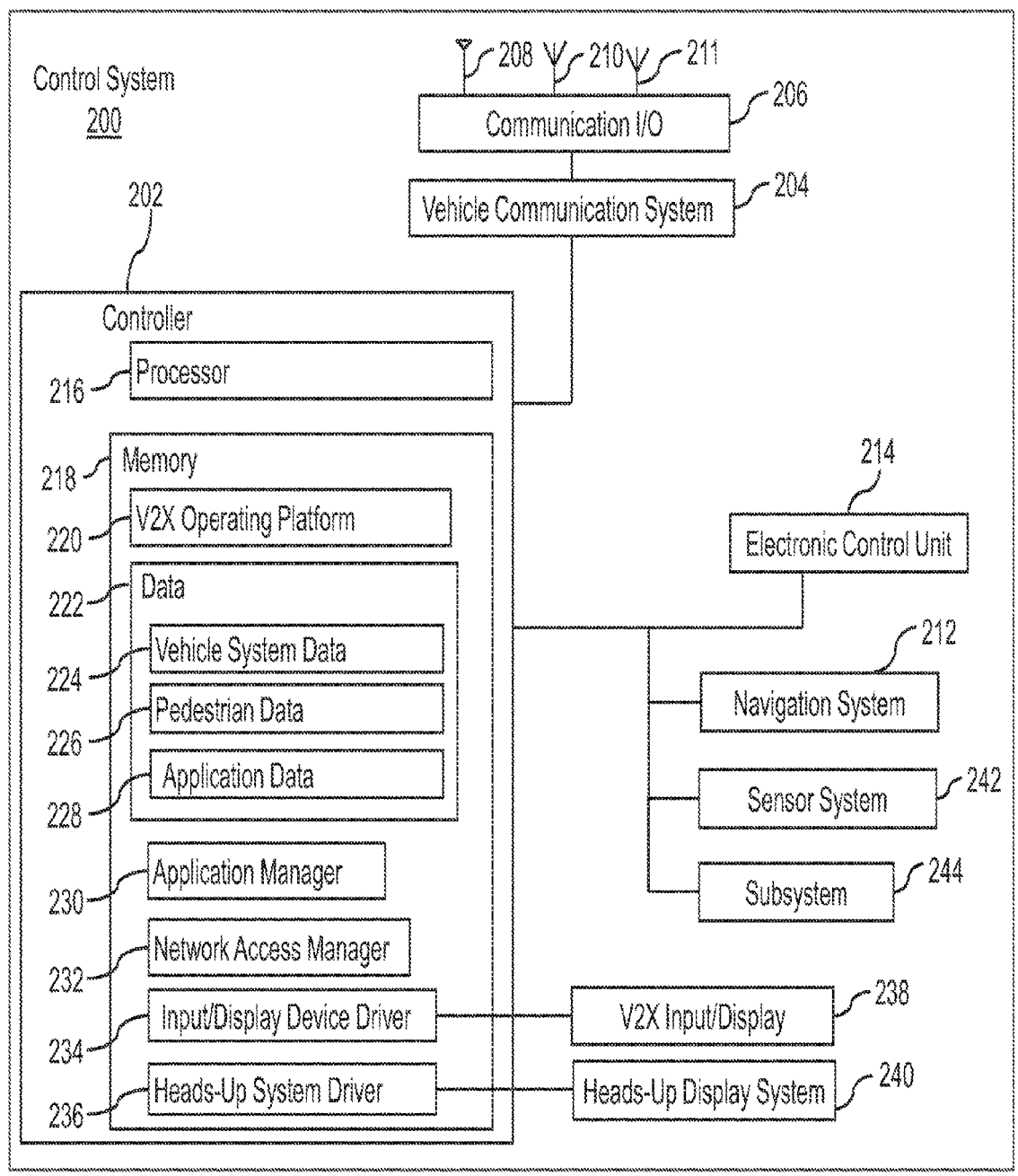
FIG. 2 is a schematic of a V2X control system according to the disclosed subject matter.

FIG. 2 is a schematic of a control system 200 according to the disclosed subject matter. The control system 200 may be separate systems and devices from, but operationally connected to, a controller 202. The host vehicle 104 may include a vehicle communication system 204 connected to a communication input/output 206, which can include, but is not limited to, a cellular communication transceiver 208, a Wi-Fi communication transceiver 210, and a short-range communication transceiver 211.

The controller 202 can include a processor 216, a memory 218, and other components typically present in general or special purpose computers. In some embodiments, the onboard controller 202 may include programmable logic circuits and/or pre-configured logic circuits for executing V2X functions. The memory 218 can store information accessible by the processor 216 including a V2X operating platform 220 and data 222 that may include instructions that may be executed or otherwise used by the processor 216. The control logic (in this example, software instructions or computer program code), when executed by the processor 216, causes the processor 216 to perform the functions of the embodiments as described herein. The memory 218 may be of any type capable of storing information accessible by the processor, including a computer-readable medium, or other medium that stores data that may be read with the aid of an electronic device, such as a hard-drive, flash drive, memory card, ROM, RAM, DVD or other optical disks, as well as other write-capable and read-only memories. Systems and methods may include different combinations of the foregoing, whereby different portions of the V2X operating platform 220 and data 222 are stored on different types of media.

The onboard controller 202 may include all of the components normally used in connection with a computer, such as a central processing unit (CPU) (e.g. processor 216), a memory 218 (e.g., RAM and internal hard drives) storing data 222 and a V2X operating platform 220, a communicator/annunciator such as a V2X input/display 238 (e.g., a monitor having a screen, a small LCD touch-screen or any other electrical device that is operable to display and/or audibly playout information) configured by an input/display device driver 234, and/or a user input device (e.g., a mouse, keyboard, touch screen, camera, scanner, and/or microphone). The controller 202 can also be include a heads-up system driver 236 that can configure a heads-up display system 240 that can be configured to display information and alerts from V2X applications. It will be understood that, although various systems and the controller 202 are shown within host vehicle 104, these elements may be external to the host vehicle 104 and/or physically separated by large distances.

The V2X operating platform 220 may be any set of instructions to be executed directly (such as machine code) or indirectly (such as scripts) by the processor 216. For example, the V2X operating platform 220 may be stored as computer code on the computer-readable medium. In this regard, the terms "instructions" and "programs" may be used interchangeably herein. The V2X operating platform 220 may be stored in object code format for direct processing by the processor 216, or in any other computer language including scripts or collections of independent source code modules that are interpreted on demand or compiled in advance. Functions, methods and routines of the V2X operating platform 220 are explained in more detail below.

Data 222 may be retrieved, stored or modified by the processor 216 in accordance with the V2X operating platform 220. For instance, although the system is not limited by any particular data structure, the data 222 may be stored in computer registers, in a relational database as a table having a plurality of different fields and records, XML documents, flat files, etc. The data 222 may also be formatted in any computer-readable format. The data 222 may include any information sufficient to identify the relevant information, such as numbers, descriptive text, proprietary codes, references to data stored in other areas of the same memory or different memories (including other network locations) or information that is used by a function to calculate the relevant data. Data 222 can include, but is not limited to, vehicle system data 224, pedestrian data 226, and application data 228. The controller 202 can also include specialized components or instructions not normally associated with general purpose computers, such as an application manager 230 that can store, track, and control versions and updates for V2P applications, and a network access manager 232 that controls and saves configurations for the communication system 204 to communicate with other V2X devices via a DSRC network.

The vehicle system data 224 can include, but is not limited to, navigation data such as latitude, longitude, and heading, speed, yaw, wheel angle, longitudinal acceleration, brake actions, a number of pedestrians in front of the host vehicle 104, and calculations regarding the headings of both the host vehicle 104 and pedestrians. Pedestrian data 226 can include pedestrian identification, location data such as latitude, longitude, and heading, speed, distance from the host vehicle 104, a relative position and relative direction. Pedestrian data can be received in DSRC VRU communication messages received from V2P devices. For example, the processor 216 can decode, log, and use new VRU awareness messages DSRC communications to use for V2P collision avoidance application data 228. The VRU awareness messages can include identification such as a road worker, a status such as running or walking, etc. The VRU awareness messages can be transmitted by V2P transceiver 128 and received by the communication system 204, decoded by processor 216, and shared in the pedestrian data 226 for subsequent coding.

The processor 216 may be any known, related art or later developed processor. Alternatively, the processor may be a dedicated device, such as an ASIC (application-specific integrated circuit), DSP (digital signal processor), etc. Although FIG. 2 illustrates the processor 216, memory 218, and other elements of controller 202 as being within the same block, it will be understood by those of ordinary skill in the art that the processor 216 and memory 218 may actually include multiple processors and memories that may or may not be stored within the same physical housing. For example, memory 218 may be a hard drive or other storage media located in a housing that is different from that of the controller 202. Accordingly, references to a processor or computer will be understood to include references to a collection of processors, computers or memories that may or may not operate in parallel. Rather than using a single processor 216 to perform the steps described herein, some of the components, for example the communication system 204 can send data and information to processor 216 or have its own processor that can perform its own operations. In an alternative embodiment, the processor 216 may be located remote from the host vehicle 104 and communicate with the vehicle wirelessly through a separate communication system. Other in-vehicle systems associated with some vehicles implemented with V2X-compatible controllers may include different elements and/or arrangements as configured for controller 202, but may be configured to operate similar to, and be compatible with, the controller 202.

The communication system 204 may include the communication input/output (I/O) 206 that can be used to control radio transmissions between the communication system 204 and external receivers for DSRC and/or Internet communications using a cellular communication transceiver 207, a Wi-Fi communication transceiver 209, and a short-range communication transceiver 211 (e.g., a Bluetooth® transceiver). The network communications can be operated by a network access manager 230. While the communication I/O 206 and communication system 204 are shown as part of the V2X control system 200 in FIG. 2, it is understood these devices may separate from the V2X control system 200.

The controller 202 may be capable of communicating with various components of the host vehicle 104 including the electronic control unit (ECU) 214, which controls one or more vehicle processes and systems relevant to operation of the host vehicle 104. The data 222 can also be gathered from host vehicle sensor 242 systems or subsystems 244 or via the ECU 214 controlling one or more host vehicle sensor systems 242 or subsystems 244. Other data from the vehicle subsystem 244 and the vehicle sensor system 242 can include, but is not limited to, braking, accelerator pedal movement, throttle movement, fuel level, a rotational speed of an engine, engine temperature, camera images, radar sensor data, etc. Vehicle navigation images and data may be received by controller 202 from a vehicle navigation system 212 via a direct communication link or through the ECU 214. The vehicle navigation system 212 may include a separate navigation system computer system and display or alternatively may share the V2X input/display 238.

III. Vehicle Interior

Figure 3:
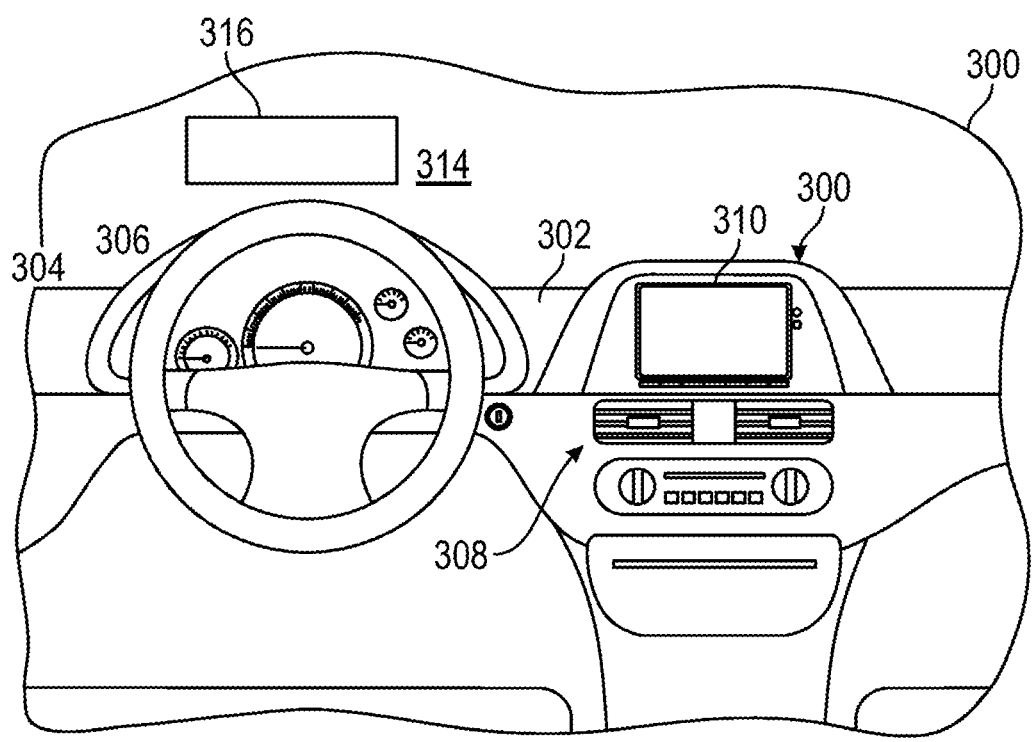
FIG. 3 is a schematic of an exemplary design of a vehicle interior including a display device with which an embodiment may operate.

FIG. 3 is a schematic of an exemplary design of a vehicle interior including a display device with which an embodiment may operate. In FIG. 3, a vehicle interior 300 may include, for example, a dashboard 302, a steering apparatus such as a steering wheel 304, an instrument panel 306, and a center portion 308. Center portion 308 can include one or more input devices including but not limited to audio devices, video devices, portable consumer device docking stations or USB ports, as well as any other types of input devices. In addition, center portion 308 can be associated with controls for one or more systems of host vehicle 104 including, but not limited to: climate control systems, radio and sound systems, and other types of systems. The vehicle interior 300 may also include a display panel 310 (that can function as the V2X input/display 238), for displaying information from the controller 202, and/or other related or unrelated vehicle systems such as vehicle navigation system 212. Examples of the display panel 310 include, but are not limited to, LCDs, CRTs, ELDs, LEDs, OLEDs, or electronic paper displays. The display panel 310 may also function as the V2X input/display 238 for activating or deactivating one or more applications of the controller 202 and selecting V2X software application update configurations. The display panel 310 can include buttons, a keypad, voice-activated controls received through a microphone or other types of user input technology on and around center dashboard 312. In an embodiment, a heads-up display 316 can be included as the viewing area of the heads-up display system 240 to display information and images on one or more surfaces that can be easily viewed by a vehicle operator. In an alternative embodiment, the heads up display 316 could be configured as a projection onto other surfaces, such as the windshield 314. In some embodiments, the heads-up display 316 can be located in any portion of vehicle interior 300, or alternatively can be a portable electronic device that can wirelessly connect to the controller 202. Additionally, the heads up display 316 can be installed in other areas of interior 300 such as the instrument panel 306 or in multiple displays such as anterior to a passenger seat headrest (not shown).

In addition, while display panel 310 can be configured to present visual information for the controller 202, the display panel 310 can be shared with other devices or systems within host vehicle 104 such as vehicle navigation system 212, vehicle communication system 204, instrument panel 306 etc. or a compatible computer system in another vehicle.

IV. Method of Operation

Figure 4:
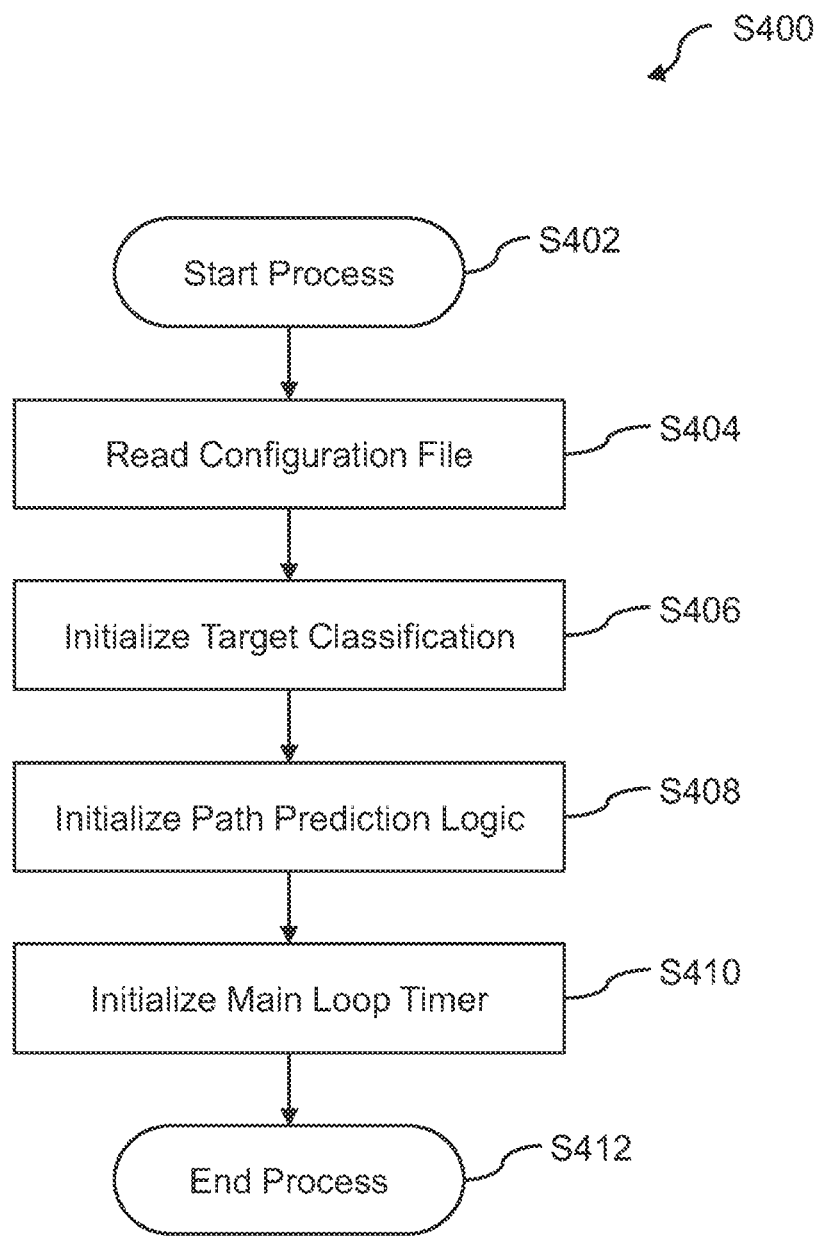
FIG. 4 is a flowchart of an exemplary logic process or algorithm for a vehicle to pedestrian cooperative safety application.

FIG. 4 is a flowchart of an exemplary logic process or algorithm S400 for a vehicle to pedestrian cooperative safety application. The embodiments can provide a process by which the controller 202 can transmit Basic Safety Messages (BSMs) and can receive Vulnerable Road User (VRU) awareness messages from a V2P transceiver 128 over DSRC channel(s). The controller 202 can analyze location data of VRUs on or near the path of the host vehicle 104 and alert the vehicle operator of VRUs, predict a potential collision threat and, based on the level of the threat, inform, warn, or alert a driver of the host vehicle 104. Contemporaneously, the V2P transceiver 128 can compute a collision threat of the host vehicle 104 and provide a warning to the pedestrian

126. The controller 202 can start the process S400 at step S402. The controller 202 can then proceed to step S404.

At step S404, the controller 202 can read a configuration file for a V2P collision avoidance application in the application manager 230. At step S406 the controller 202 can initialize target classification logic for the V2P application. The target classification logic can determine a relative position and heading of a pedestrian with respect to a predicted path of the host vehicle 104. At step S408 the controller 202 controller can initialize path prediction logic. The path prediction logic can analyze vehicle system data 224 and predict a path of the host vehicle 104. The path prediction logic can also analyze pedestrian data 226 and predict a path of a pedestrian. At step S410 the controller 202 can initialize the main loop timer, which can be a time between executions of the main loop logic by the controller 202 used for gathering pedestrian data 226 and vehicle system data 224. The process 400 can end at step S412. The subroutines executing the process initializing steps S404, S406, S408 and S410 are described further as the exemplary methods in FIG. 5

Figure 5:
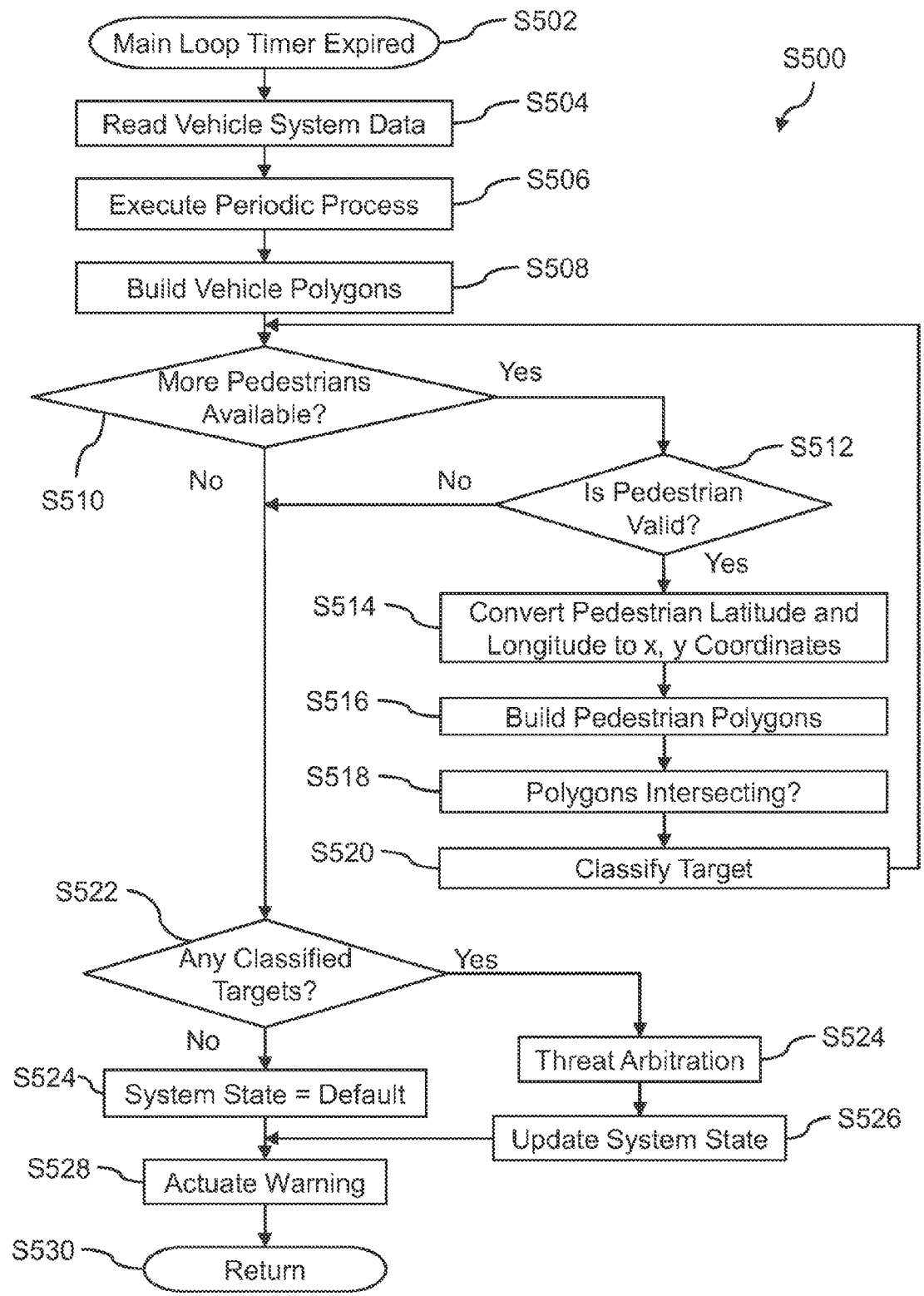
FIG. 5 is a flowchart of an exemplary process for determining a vehicle collision threat with a pedestrian according to the disclosed subject matter.

FIG. 5 is a flowchart of an exemplary process for determining a vehicle collision threat with a pedestrian according to the disclosed subject matter. The controller 202 can start the process S500 at step S502, where the main loop timer expired. In one embodiment, the main timer loop could be 100 ms. However the main loop timer delay is merely exemplary and the embodiments intend to include or otherwise cover time loops of more or less than 100 ms. The controller 202 can then proceed to step S504.

At step S504, the controller 202 can read the vehicle system data 224 from the data 222 in the memory 218. In other embodiments, the controller 202 can receive the vehicle system data 224 directly from the ECU 214 or vehicle sensor systems 242, thereby bypassing memory 218. The controller 202 can also read vehicle system data received from the navigation system 212, which can include vehicle latitude, longitude, heading, etc. from a GPS module or other navigation module or application. At step S506 the controller 202 can execute a periodic process, which can process vehicle data such as yaw curve data from a low pass filter and compare the filtered radius of a curve to a calculated radius. At step S508, the controller 202 can execute a process to build vehicle polygons in order to provide a path prediction of the host vehicle 104. The process to build vehicle polygons can use a hardcoded number of polygons to represent a predicted path of the vehicle 104. This process is further disclosed in regard to FIG. 6.

Figure 8:
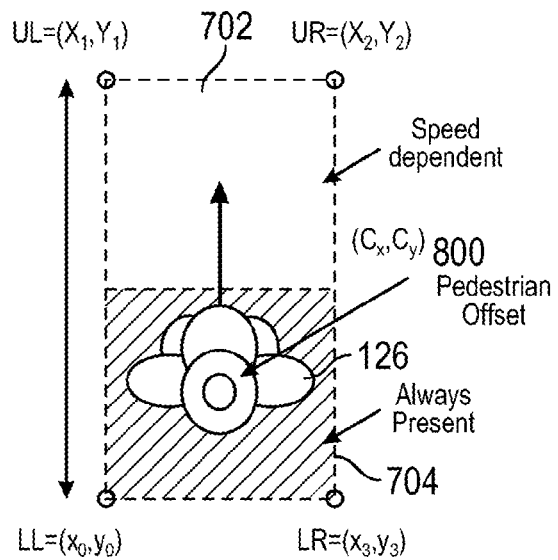
FIG. 8 is a schematic defining a pedestrian predicted path polygon according to the disclosed subject matter.
Figure 9:
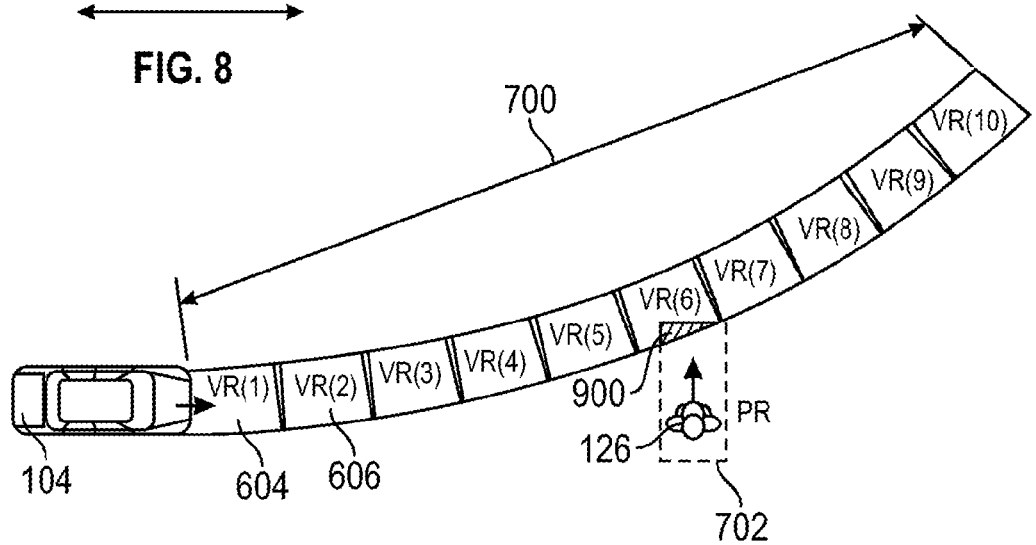
FIG. 9 is a schematic of vehicle and pedestrian predicted path polygons intersecting according to the disclosed subject matter.
Figure 10:
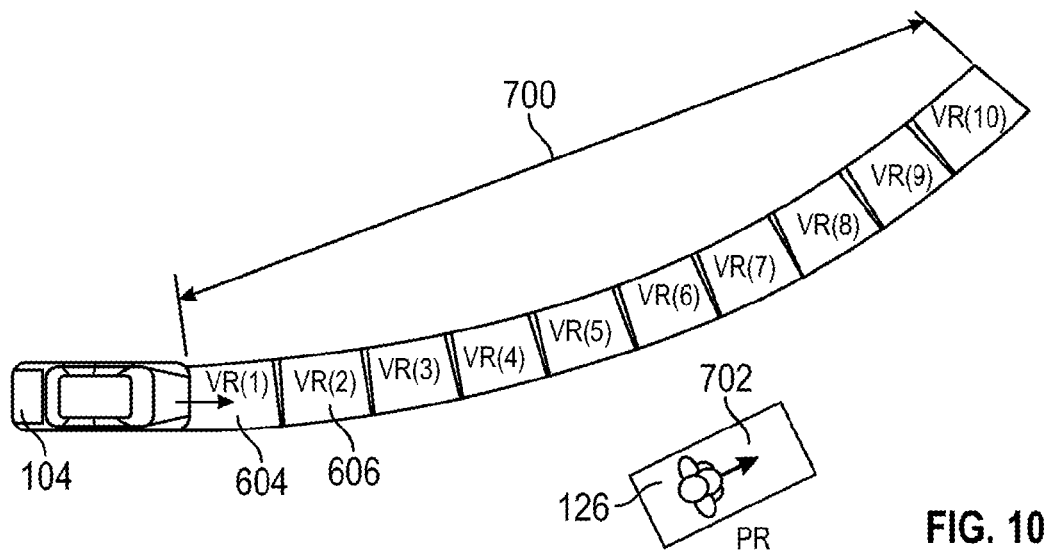
FIG. 10 is a schematic of vehicle and pedestrian predicted path polygons not intersecting according to the disclosed subject matter.
Figure 11:
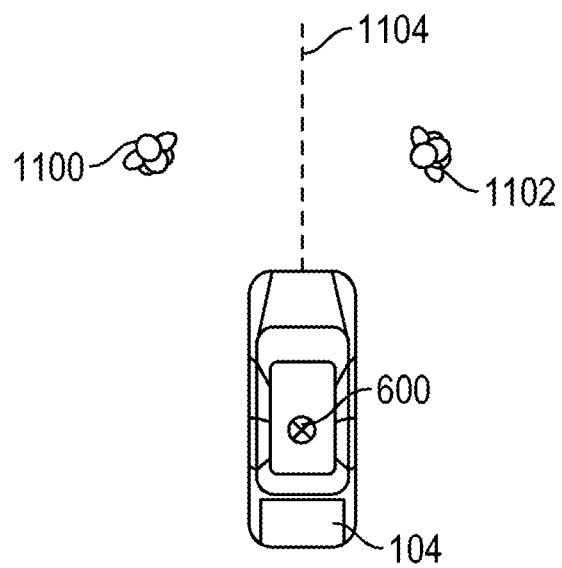
FIG. 11 is a schematic of a relative position of a pedestrian with respect to a vehicle predicted path according to the disclosed subject matter.
Figure 12:
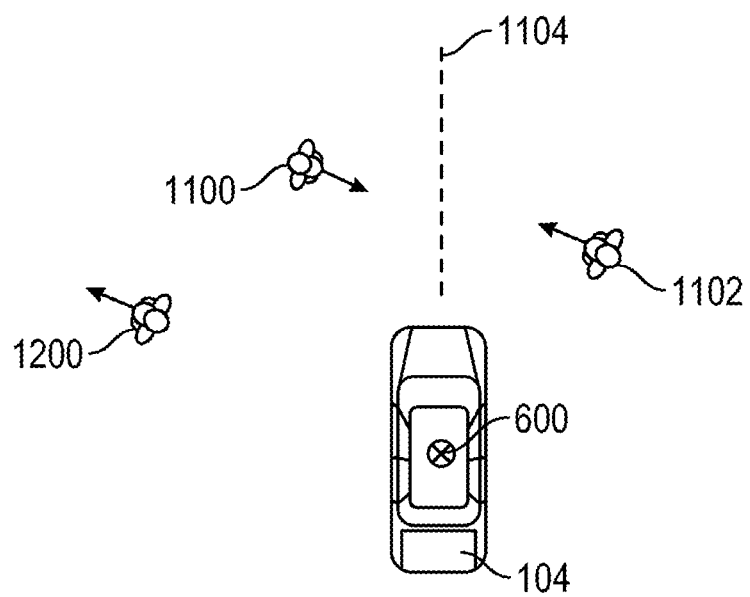
FIG. 12 is a schematic of a relative direction of a pedestrian with respect to a vehicle predicted path according to the disclosed subject matter.

At step S510, the controller 202 can determine from pedestrian data 226 if there are one or more pedestrians available on or within a predetermined distance away from a path of the host vehicle 104. If more pedestrians are available in step S510, then at step S512 the controller 202 can determine if a pedestrian is valid. In one embodiment, the controller 202 can receive at least one second of pedestrian data 226 from VRU awareness messages broadcast from a V2P transceiver. However, the time threshold for VRU awareness messages is merely exemplary and can include higher or lower time thresholds than one second. For each valid pedestrian at step S512, the controller 202 can proceed to step S514 to execute an exemplary pedestrian classification algorithm. At step S514, the controller 202 can convert each set of latitude and longitude pedestrian data 226 into x,y coordinates. In one embodiment, each pedestrian x,y coordinates are assumed to be a center point of each pedestrian. At step S516, the controller 202 can build pedestrian polygons for each valid pedestrian's location and predicted path. In one embodiment, the number of polygons used in the path prediction can be hardcoded in the application. For example, in one embodiment a pedestrian path prediction of one polygon can be hardcoded in the application. However, the embodiments intend to include or otherwise cover any number of polygons for a path prediction of a pedestrian. A schematic for building pedestrian polygons is illustrated in FIG. 8. At step S518, the controller 202 can determine if the pedestrian polygon intersects or may intercept one or more of the predicted path vehicle polygons. Schematics of the embodiments are illustrated in FIGS. 9 and 10. At step S520, the controller 202 can classify a target. For example, the controller 202 can determine a position of the pedestrian 126 with respect to the host vehicle 104 (i.e., left or right side) and the alert appropriate for the target (i.e., to inform, alert, warn, etc. the host vehicle 104 and/or the pedestrian 126). This embodiment is illustrated in FIGS. 11 and 12. The process then proceeds back to the decision step S510 to determine if any more pedestrians are available. At step S510, if no more pedestrians are available to validate, then the process proceeds to step S522. Additionally, if, at step S512, a pedestrian is not valid, then the process likewise proceeds to step S522 to determine if there are any classified targets.

At step S522, the controller 202 can determine if there are any classified targets identified in the logic process S500. If no targets are classified, then at step S524 the system state for the V2P application remains in a default state. The controller 202 can actuate messages or warnings at step S528 to a driver using the heads up display 316 based on the default state. At step S522 if targets are classified, then in step S524 threat arbitration is performed by the controller 202 to determine the most critical threat(s) to the host vehicle 104. At step S526, the controller 202 can update the V2P system state of a V2P application. At step S528, the controller 202 can actuate one or more warnings to a driver of the host vehicle 104 using the heads up display 316 to inform, warn, or alert the driver based on the position of the pedestrian with respect to the host vehicle 104 and warning zone in step S520. The process S500 can end at step S530.

Figure 6:
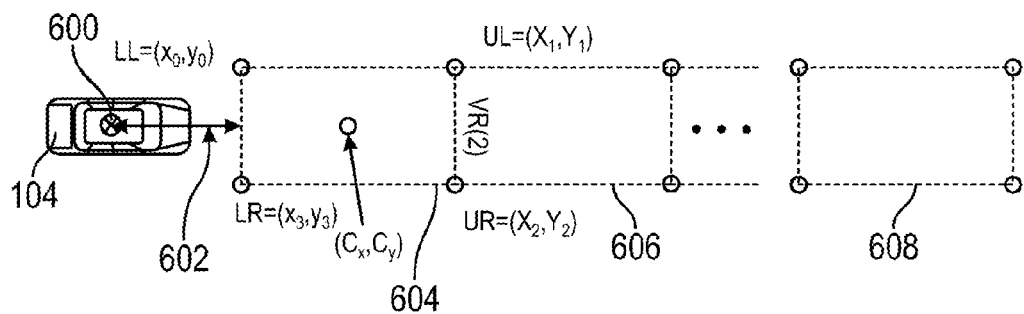
FIG. 6 is a schematic defining vehicle predicted path polygons according to the disclosed subject matter.

FIG. 6 is a schematic defining vehicle predicted path polygons. In the process 500, the controller 202 can define a vehicle center point 600 for the host vehicle 104 and convert latitude/longitude coordinates of the vehicle center point 600 into x,y coordinates. The controller 202 can define a bumper offset distance 602 from the vehicle center point 600 to the nearest edge of a first vehicle polygon 604. The first vehicle polygon can be defined with five coordinate points, a lower left point $LL=(x_0,y_0)$, an upper left point $UL=(x_1,y_1)$, an upper right point $UR=(x_2,y_2)$, a lower right point $LR=(x_3,y_3)$, and a center point $C=(c_x,c_y)$. A width of the first vehicle polygon 604 can be predefined as a distance of a road lane width. However, in the embodiments the width can be defined as wider as or smaller than a road lane but should be at least a width of the host vehicle 104. A length of the first vehicle polygon 604 can be defined as a relative distance that depends on a speed of the host vehicle 104. In one embodiment, a length of the first vehicle polygon 604 can be defined as a warning time in seconds multiplied by speed and divided by the number of vehicle polygons used in the application process. Other embodiments could use different calculations to determine a width and length of a vehicle polygon. The first vehicle polygon 604 can be defined as a vehicle rectangle VR(1). However, the embodiments intend to include or otherwise cover other polygonal shapes such as square, trapezoid, or any other shape that can implement the functions of the embodiments. The controller 202 can define a predetermined number of vehicle polygons in a predicted path of the host vehicle 104 that can be hardcoded into an application by the processor 216. For example, a second vehicle polygon (VR(2)) 606 and an Nth vehicle polygon 608 are defined in the predicted path of the host vehicle 104. The controller 202 can position the center points (e.g., C=($c_x$,$c_y$)) of each vehicle polygon depending on the path prediction (curvature) and speed of the host vehicle 104. The embodiments are intended to include or otherwise cover any number of vehicle polygons 604, 606, 608 hardcoded into a V2P application by the processor 216 as well as any shape of the vehicle polygons 604, 606, 608. In some embodiments, the processor 216 can vary a shape of each defined vehicle polygon 604, 606, 608 even within the same hardcoded array as a predicted path of the host vehicle 104.

Figure 7:
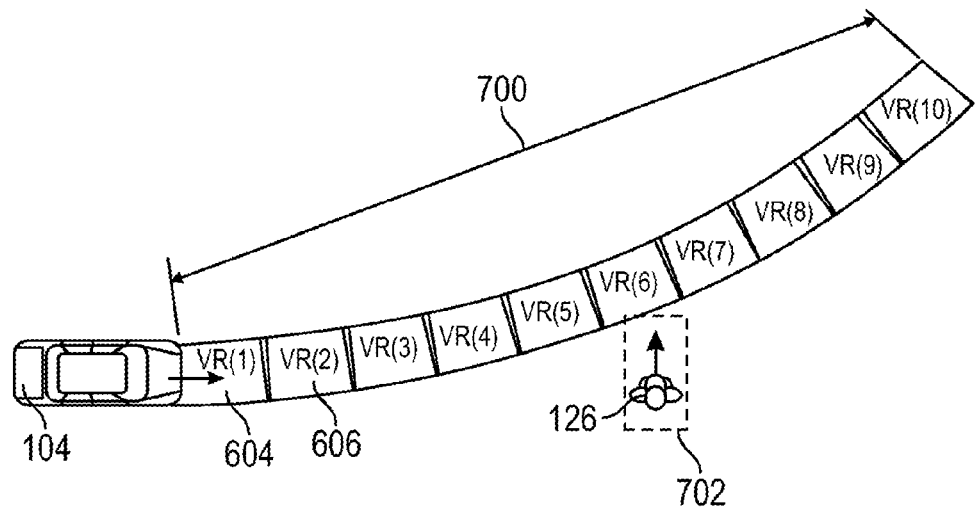
FIG. 7 is a schematic of vehicle predicted path polygons for a vehicle in a curve according to the disclosed subject matter.

FIG. 7 is a schematic of vehicle predicted path polygons for a vehicle in a curve. An array of vehicle polygons 700 ahead of the host vehicle 104 can include the first vehicle polygon VR(1) 604, the second vehicle polygon VR(2) 606, and a group of eight additional vehicle polygons labeled VR(3) to VR(10) and arranged in a curved path representing the predicted path of the host vehicle 104. The vehicle polygon array 700 can be hardcoded into the vehicle system data 222 or other areas of the memory 218 for use by the processor 216 and application manager 230 when implementing the embodiments. However, the number of vehicle polygons used in path prediction of the host vehicle 104 is exemplary, and the embodiments intend to include or otherwise cover any number of hardcoded vehicle polygons into the memory 218 for use by the processor 216 and application manager 230. In FIG. 7, the pedestrian 126 is positioned facing the vehicle polygon array 700 with an arrow representing movement. An exemplary pedestrian polygon 702 surrounds the pedestrian 126. An arrow represents pedestrian movement in a direction of the predicted path vehicle polygon array 700.

FIG. 8 is a schematic defining a pedestrian polygon 702 to represent a predicted path of the pedestrian 126. The controller 202 can define the pedestrian polygon 702 including a pedestrian center point 800 and convert latitude/longitude coordinates of the pedestrian center point 800 into x,y coordinates. The pedestrian polygon 702 can be subdivided into an always present polygon 704 within the pedestrian polygon 702. The controller can define the always present polygon 704 with predetermined distances around the pedestrian center point 800 whenever a pedestrian is targeted. If the pedestrian 126 is moving, the controller can add the pedestrian polygon 702 that is defined as a speed-dependent pedestrian polygon. The controller 202 can also define the pedestrian polygon 702 with five coordinate points, a lower left point LL=($x_0$,$y_0$), an upper left point UL=($x_1$,$y_1$), an upper right point UR=($x_2$,$y_2$), a lower right point LR=($x_3$,$y_3$), and the pedestrian center point C=($c_x$,$c_y$). A width of the pedestrian polygon 702 can be defined as a predetermined pedestrian offset distance to either side of the pedestrian center point, and a length of the pedestrian polygon 702 can be defined as a relative distance that depends on a speed of the pedestrian 126 (if moving). In one embodiment, a length of the pedestrian polygon 702 can be defined as a warning time in seconds multiplied by a pedestrian speed added to a doubled value of a pedestrian offset distance. Other embodiments could use different calculations to determine a width and length of a pedestrian polygon 702. The pedestrian polygon 702 can be defined as a pedestrian rectangle PR. However, the embodiments for a pedestrian polygon 702 and an always present polygon 704 are intended to include or otherwise cover other polygonal shapes such as square, trapezoid, or any other shape that can implement the functions of the embodiments. In alternative embodiments, the controller 202 can define additional pedestrian polygons in a predicted path of the pedestrian 126, for example, a second pedestrian polygon 702 could be defined in the predicted path of the pedestrian 126. The controller 202 can position the location of each pedestrian polygon 702 depending on the path prediction (curvature) of the pedestrian 126.

FIG. 9 is a schematic of vehicle and pedestrian predicted path polygons intersecting. FIG. 9 illustrates the first vehicle polygon 604, second vehicle polygon 606, and the vehicle polygon array 700 along a curve of a predicted path for the host vehicle 104 from FIG. 7. Implementation of the process steps to build vehicle polygons S508 and build pedestrian polygons S516 can proceed in step S518 to determining whether the vehicle polygon array 700 and pedestrian polygon 702 will intersect. In the scenario, the pedestrian 126 is moving in a direction towards the predicted path of the host vehicle 104 represented by the vehicle polygon array 700. Based on the vehicle system data 224 and pedestrian data 226, the controller 202 can determine that the pedestrian polygon 702 (predicted path of the pedestrian 126) will intersect the vehicle polygon array 700 (predicted path of the host vehicle 104) within vehicle polygon VR(6) (illustrated as a collision area 900).

FIG. 10 is a schematic of vehicle and pedestrian predicted path polygons not intersecting. FIG. 10 illustrates the first vehicle polygon 604, second vehicle polygon 606, and the vehicle polygon array 700 along a curve of a predicted path for the host vehicle 104 from FIG. 7. Implementation of the process steps to build vehicle polygons S508 and build pedestrian polygons S516 can proceed to a determination in step S518 of whether the vehicle and pedestrian polygons intersect. The pedestrian 126 is moving in a direction away from a predicted path of the host vehicle 104. Based on the vehicle system data 224 and pedestrian data 226, the controller 202 can determine the pedestrian polygon 702 of a predicted path of the pedestrian 126 will not intersect the vehicle polygon array 700.

FIG. 11 is a schematic of a relative position of a pedestrian with respect to a vehicle predicted path. FIG. 11 illustrates one embodiment of the process S520 to classify one or more target pedestrians. The controller 202 can determine whether a pedestrian that has been validated in step S512 is positioned on a left side or a right side of a longitudinal center line 1104 of a predicted path of the host vehicle 104. In the embodiments, the controller 202 can receive basic safety messages from a first target pedestrian 1100 and from a second target pedestrian 1102. The controller 202 can parse the basic safety messages for pedestrian location data (e.g., V2P GPS data) and plot the data relative to the center line 1104 of the host vehicle 104. In the example, the pedestrian data 226 received from the first target pedestrian 1100 plots to the left of the center line 1104 and therefore the relative position is classified LEFT of the host vehicle 104. In another example, pedestrian data 226 received from the second target pedestrian 1102 plots to the right of the center line 1104 and therefore the relative position is classified RIGHT of the host vehicle 104.

FIG. 12 is a schematic of a relative direction of a pedestrian with respect to a vehicle predicted path. FIG. 12 illustrates another embodiment of the process S520 to classify one or more target pedestrians. The controller 202 can determine whether a pedestrian that has been validated in step S512 is moving towards or away from the center line 104 of the predicted path of the host vehicle 104. In the embodiments, the controller 202 can receive basic safety messages broadcast from the first target pedestrian 1100, the second target pedestrian 1102, and a third target pedestrian 1200. The controller 202 can parse the basic safety messages for pedestrian data 226 (e.g., V2P GPS data) and plot the locations over a predetermine time period relative to the center line 1104 of a predicted path of the host vehicle 104. The plot of pedestrian movement can determine direction of movement relative to the path of the host vehicle 104. In the example, location pedestrian data 226 received from the first target pedestrian 1100 can indicate movement to the right, and therefore the relative movement is classified as moving TO RIGHT of a pedestrian center point (towards the center line 1104). In another example, location pedestrian data 226 received from the second target pedestrian 1102 can indicate movement to the left and therefore the relative movement is classified as moving TO LEFT of a pedestrian center point (away from the center line 1104). In a further example, location data received from the third target pedestrian 1200 can indicate movement to the left and therefore the relative movement is classified as moving TO LEFT of a pedestrian center point (away from the center line 1104).

Figure 13:
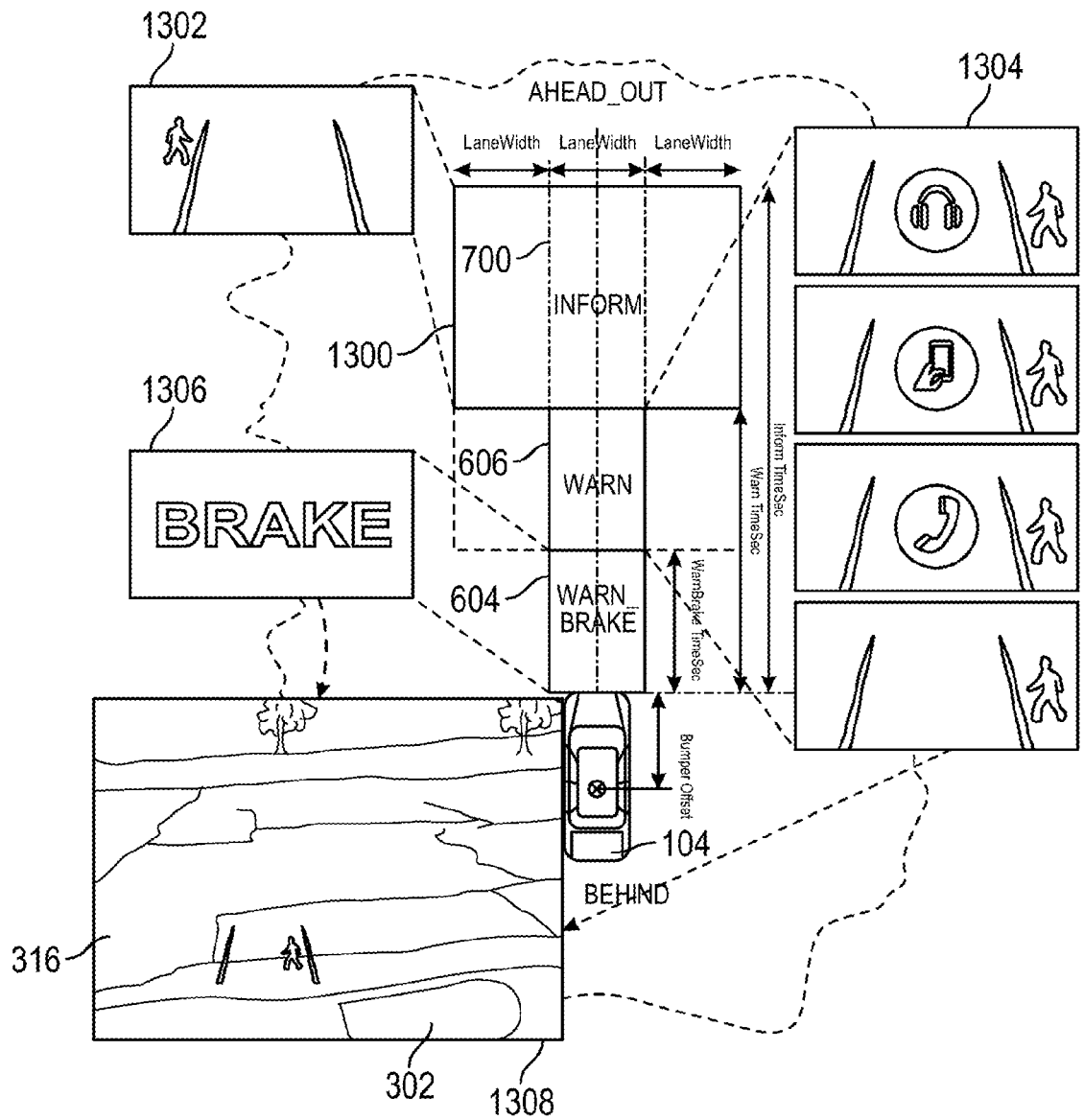
FIG. 13 is an in-vehicle implementation of a V2X system according to the disclosed subject matter.

FIG. 13 is a schematic of an exemplary V2P collision avoidance application implementation in a vehicle according to the disclosed subject matter. In FIG. 13, the heads-up display 316 is illustrated installed on the dashboard 302. The inside the vehicle view 1308 includes a pedestrian in the upper right hand corner indicating movement (walking) towards an apparent path of the host vehicle 104. The controller 202 has hardcoded the vehicle polygon array 700 ahead of the host vehicle 104 and assigned warning levels to the zones defined by one or more individual vehicle polygons within the vehicle polygon array 700. The warning levels can correspond to one or more graphical warnings depicting a graphical pedestrian on or near the predicted path of the host vehicle 104. The one or more graphical warnings can be displayed on the heads-up display 316 for the vehicle occupants to view. In an embodiment, the controller 202 can define the vehicle polygons VR3 to VR10 in the vehicle polygon array 700 as "Inform" zones. The controller 202 can also define a wider area 1300 than the predicted path vehicle polygon array 700, such as multiple lane widths wide, as an "Inform Zone." The first vehicle polygon 604 can be defined as a Warn-Brake zone. If a pedestrian polygon 702 intersects with the Warn-Brake zone, the controller 202 can display a Brake image 1306 on the heads-up display 316. The second vehicle polygon 606 can be defined as a Warn zone. If a pedestrian polygon 702 intersects with the Warn zone, the controller 202 can display one or more alert images 1304 on the heads-up display 316 that show a location of the pedestrian 126 relative to the path of the host vehicle 104. The remaining vehicle polygons in the vehicle polygon array 700 can be defined as an Inform zone, either in the predicted path vehicle polygon array 700 width or an expanded warning zone 1300. If a pedestrian polygon 702 intersects with the expanded warning zone 1300, the controller 202 can display one or more inform images 1302 on the heads-up display 316.

If there are pedestrians in more than one zone, then the controller 202 can perform the threat arbitration process S524 by selecting a most critical pedestrian in the highest threat zone, such as the zone closest to the host vehicle. For example the controller 202 can first select to warn the host vehicle 104 of a pedestrian polygon 702 intersecting the first vehicle polygon 604 in the Warn-Brake zone if pedestrians are located in both the Warn-Brake zone and the Warn zone.

Figure 14:
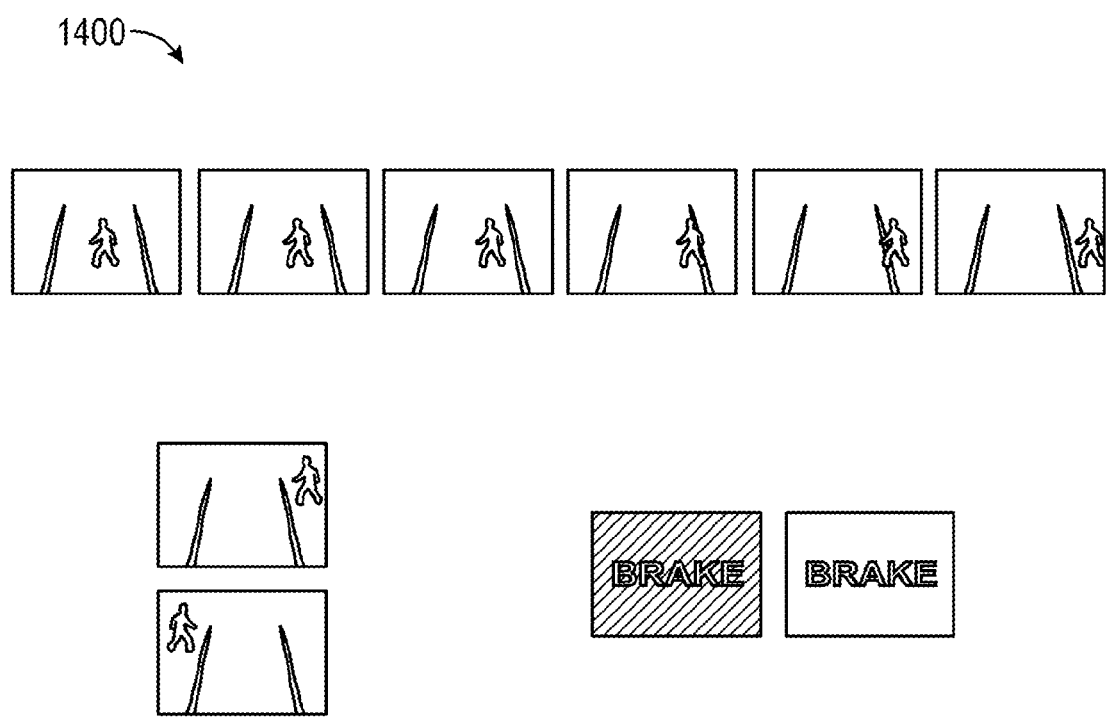
FIG. 14 is a schematic of graphical images of driver warnings according to the disclosed subject matter.

FIG. 14 is a schematic of graphical warnings to a driver for a V2P collision avoidance application according to the disclosed subject matter. The graphical warnings 1400 illustrated in FIG. 14 are exemplary, and the embodiments intend to include or otherwise cover other graphical, textual, or audible warnings the controller 202 can display on the heads-up display 316. The graphical warnings depict a symbol for a pedestrian at various positions near or within a predicted path of the host vehicle 104. The pedestrian symbol can be illustrated in a motion pose facing left or right from a center of a predicted path. Additionally, a "Brake" text warning can be displayed on the heads-up display 316 when a pedestrian polygon 702 intersects the Warn-Brake zone in vehicle polygon 604.

In this document, the terms "computer program product" and "computer-readable medium" may be used generally to refer to media such as, for example, memory, storage devices, storage unit, or signal(s) on channel. These and other forms of computer-readable media may be involved in providing one or more sequences of one or more instructions to processor for execution. Such instructions, generally referred to as "computer program code" (which may be grouped in the form of computer programs or other groupings), when executed, enable the controller 202 to perform features or functions of embodiments of the present invention.

In an embodiment where the elements are implemented using software, the software may be stored in a computer-readable medium and loaded into a computer system using, for example, removable storage unit, media drive or communications interface. The control logic (in this example, software instructions or computer program code), when executed by processor 216, causes processor 216 to perform the functions of the invention as described herein. The above described techniques may take the form of computer or controller implemented processes and apparatuses for practicing those methods. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the embodiments. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the embodiments. When implemented on a general-purpose microprocessor, the computer program code segments configure the microprocessor to create specific logic circuits.

V. Alternative Embodiments

While certain embodiments of the invention are described above, and FIGS. 1-14 disclose the best mode for practicing the various inventive aspects, it should be understood that the invention can be embodied and configured in many different ways without departing from the spirit and scope of the invention.

Exemplary embodiments are intended to include or otherwise cover any type of application for use by a vehicle's V2X computer system according to one or more user defined or automatically determined criteria.

Some of the exemplary embodiments are disclosed in the context of in-vehicle vehicle computer systems for V2X systems. However, any and all of the disclosed features can also be applied to other types of computer systems. In fact, some embodiments can be applied in contexts that do not involve vehicles.

Exemplary embodiments are intended to include or otherwise cover any type of a software-driven system for host vehicle 104 according to the embodiments that can be configured outside of the host vehicle 104 and that can communicate instructions and commands for execution of system operations. An example of a V2X system that can be configured outside of the host vehicle 104 is a V2X controller that is manufactured, tested, and configured as an individual unit, and the unit later installed within host vehicle 104. In other words, the various embodiments are not limited to vehicle V2X systems, and can alternatively or additionally be applied to other vehicle systems that include software and/or firmware.

Exemplary embodiments are intended to cover execution of method steps on any appropriate specialized or general purpose server, computer device, or processor in any order relative to one another. Some of the steps in the embodiments can be omitted, as desired, and executed in any order.

A computer architecture of the embodiments may be a general purpose computer and/or processor or a special purpose computer and/or processor. A computer and/or processor can be used to implement any components of the controller 202 or the computer-implemented methods of the embodiments. For example, components of the controller 202 can be implemented on a computer via its hardware, software program, firmware, or a combination thereof. Although individual computers or servers are shown in the embodiments, the computer functions relating to the controller 202 may be implemented in a distributed fashion on a number of similar platforms, to distribute the processing and/or functional load.

Embodiments are also intended to include or otherwise cover methods of using and methods of manufacturing the controller 202 disclosed above. The methods of manufacturing include or otherwise cover processors and computer programs implemented by processors used to design various elements of the controller 202 above. For example, embodiments are intended to cover processors and computer programs used to design or test the controller 202.

Exemplary embodiments are intended to cover all software or computer programs capable of enabling processors to execute instructions and implement the above operations, designs and determinations. Exemplary embodiments are also intended to cover any and all currently known, related art or later developed non-transitory recording or storage mediums (such as a CD-ROM, DVD-ROM, hard drive, RAM, ROM, floppy disc, magnetic tape cassette, etc.) that record or store such software or computer programs. Exemplary embodiments are further intended to cover such software, computer programs, systems and/or processes provided through any other currently known, related art, or later developed medium (such as transitory mediums, carrier waves, etc.), usable for implementing the exemplary operations disclosed above.

These computer programs can be executed in many exemplary ways, such as an application that is resident in the memory of a device or as a hosted application that is being executed on a server and communicating with the device application or browser via a number of standard protocols, such as TCP/IP, HTTP, XML, SOAP, REST, JSON and other sufficient protocols. The disclosed computer programs can be written in exemplary programming languages that execute from memory on the device or from a hosted server, such as BASIC, COBOL, C, C++, Java, Pascal, or scripting languages such as JavaScript, Python, Ruby, PHP, Perl or other sufficient programming languages.

Embodiments are amenable to a variety of modifications and/or enhancements. For example, although the implementation of various components described above may be embodied in a hardware device, it can also be implemented as a software-only solution, e.g., an installation on an existing server. In addition, systems and their components as disclosed herein can be implemented as a firmware, firmware/software combination, firmware/hardware combination, or a hardware/firmware/software combination.

Some of the disclosed embodiments include or otherwise involve data transfer over a DSRC network, such as downloading update files over the network. The network may include, for example, one or more of the Internet, Wide Area Networks (WANs), Local Area Networks (LANs), analog or digital wired and wireless telephone networks (e.g., a PSTN, Integrated Services Digital Network (ISDN), a cellular network, and Digital Subscriber Line (xDSL)), Wi-Fi networks, a Dedicated Short Range Communications (DSRC), network, short-wave radio, television, cable, satellite communications, and/or any other delivery or tunneling mechanism for carrying data. A network may include multiple networks or sub-networks, each of which may include, for example, a wired or wireless data pathway. The network may include a circuit-switched network, a packet-switched network, or any other network able to carry electronic communications. For example, the network may include networks based on the Internet protocol (IP) or asynchronous transfer mode (ATM).

While the subject matter has been described in detail with reference to exemplary embodiments thereof, it will be apparent to one skilled in the art that various changes can be made, and equivalents employed, without departing from the scope of the invention.

What is claimed is:

1. A vehicle control system for use with: a vehicle communications network, at least one source of pedestrian data relevant to at least one pedestrian's location, and at least one source of vehicle system data relevant to the vehicle's location and movement, the control system, comprising:
   a processor that is configured to:
      access the pedestrian data and the vehicle system data,
      determine a vehicle's current location and speed based on the vehicle system data,
      build a predetermined number of vehicle polygons hardcoded into an application for representing a predicted path of the vehicle,
      build at least one pedestrian polygon representing a predicted path for at least one pedestrian detected in pedestrian data,
      define a plurality of warning zones based on the vehicle polygons, each warning zone defined by one or more vehicle polygons within the predicted path of the vehicle with a different level of warning based on a distance of each vehicle polygon from the vehicle,
      determine if one or more of the pedestrian polygons intersects at least one of the predetermined number of hardcoded vehicle polygons, and
      actuate a warning to a vehicle operator based on an intersection of the one or more pedestrian polygons with one or more of the vehicle polygons.

2. The vehicle control system of claim 1, wherein the processor builds the predetermined number of hardcoded vehicle polygons based on at least a speed of the vehicle to determine a length of each vehicle polygon.

3. The vehicle control system of claim 1, wherein the processor builds the predetermined number of hardcoded vehicle polygons based on predetermined distances from a center point of the vehicle to determine a width of each vehicle polygon.

4. The vehicle control system of claim 1, wherein the processor builds the at least one pedestrian polygon based on at least a speed of the pedestrian to determine a length of each pedestrian polygon.

5. The vehicle control system of claim 1, further comprising the processor configured to classify each pedestrian detected in the pedestrian data as either at a left position or a right position relative to a centerline of the predicted path of the vehicle.

6. The vehicle control system of claim 5, further comprising the processor configured to classify each pedestrian detected in the pedestrian data as either a left movement direction or a right movement direction relative to a centerline of the predicted path of the vehicle.

7. The vehicle control system of claim 6, further comprising:
a display screen operationally connected to the controller, wherein the processor is configured to actuate the warning to the display screen, wherein the processor can display a relative direction and position each pedestrian detected in the pedestrian data.

8. The vehicle control system of claim 1, wherein the processor is further configured to actuate the warning based on an intersection of the one or more pedestrian polygons with one or more of the warning zones.

9. The vehicle control system of claim 1, wherein the processor is further configured to build the vehicle polygons by defining coordinates at each corner of each polygon based on an offset distance from a center point location of the vehicle.

10. The vehicle control system of claim 1, wherein the processor is further configured to build the vehicle polygons by defining a lane width as a width of each vehicle polygon and defining a lane curve as curvature of the predetermined number of vehicle polygons.

11. A vehicle control system for use with: a vehicle communications network, at least one source of pedestrian data relevant to at least one pedestrian's location, and at least one source of vehicle system data relevant to the vehicle's location and movement, the control system, comprising:
a vehicle communication system that is configured to receive pedestrian data from a pedestrian transceiver device, the pedestrian data including one or more pedestrian locations relevant to a location of the vehicle;
an electronic storage medium that is configured to store at least one of the pedestrian data and vehicle system data,
a processor that is configured to:
access the pedestrian data and the vehicle system data,
determine a vehicle's current location and speed based on the vehicle system data,
build a predetermined number of vehicle polygons hardcoded into an application for representing a predicted path of the vehicle,
build at least one pedestrian polygon representing a predicted path for at least one pedestrian detected in pedestrian data,
define a plurality of warning zones based on the vehicle polygons, each warning zone defined by one or more vehicle polygons within the predicted path of the vehicle with a different level of warning based on a distance of each vehicle polygon from the vehicle,
determine if one or more of the pedestrian polygons intersects at least one of the predetermined number of hardcoded vehicle polygons, and
actuate a warning to a vehicle operator based on an intersection of the one or more pedestrian polygons with one or more of the vehicle polygons.

12. The vehicle control system of claim 11, wherein the processor builds the predetermined number of hardcoded vehicle polygons based on at least a speed of the vehicle to determine a length of each vehicle polygon.

13. The vehicle control system of claim 1, wherein the processor builds the predetermined number of hardcoded vehicle polygons based on predetermined distances from a center point of the vehicle to determine a width of each vehicle polygon.

14. The vehicle control system of claim 1, wherein the processor builds the at least one pedestrian polygon based on at least a speed of the pedestrian to determine a length of each pedestrian polygon.

15. The vehicle control system of claim 1, further comprising the processor configured to classify each pedestrian detected in the pedestrian data as either at a left position or a right position relative to a centerline of the predicted path of the vehicle.

16. The vehicle control system of claim 5, further comprising the processor configured to classify each pedestrian detected in the pedestrian data as either a left movement direction or a right movement direction relative to a centerline of the predicted path of the vehicle.

17. The vehicle control system of claim 6, further comprising:
a display screen operationally connected to the controller, wherein the processor is configured to actuate the warning to the display screen, wherein the processor can display a relative direction and position each pedestrian detected in the pedestrian data.

18. The vehicle control system of claim 1, wherein the processor is further configured to actuate the warning based on an intersection of the one or more pedestrian polygons with one or more of the warning zones.

19. The vehicle control system of claim 1, wherein the processor is further configured to build the vehicle polygons by defining coordinates at each corner of each polygon based on an offset distance from a center point location of the vehicle, and
wherein the processor is further configured to build the vehicle polygons by defining a lane width as a width of each vehicle polygon and defining a lane curve as curvature of the predetermined number of vehicle polygons.

20. A method to enhance pedestrian safety using a vehicle control system that is configured for use with: a vehicle communications network, at least one source of pedestrian data relevant to at least one pedestrian's location, and at least one source of vehicle system data relevant to the vehicle's location and movement, the method comprising:
accessing the pedestrian data and the vehicle system data;
determining the vehicle's current location and speed based on the vehicle system data;
determining the pedestrian's current location and speed based on the pedestrian data;

building a predetermined number of vehicle polygons hardcoded into an application that represent a predicted path of the vehicle;

building at least one pedestrian polygon that represents a predicted path the pedestrian;

defining a plurality of warning zones based on the vehicle polygons, each warning zone defined by one or more vehicle polygons within the predicted path of the vehicle with a different level of warning based on a distance of each vehicle polygon from the vehicle;

determining if one or more of the pedestrian polygons intersects at least one of the predetermined number of hardcoded vehicle polygons; and actuating a warning to a vehicle operator based on an intersection of the one or more pedestrian polygons with one or more of the vehicle polygons.

* * * * *